April 3, 1951 R. A. MASSEY 2,547,715
OVERHEAD-SUSPENDED CAR FOR RACE TRACKS
Filed July 24, 1947
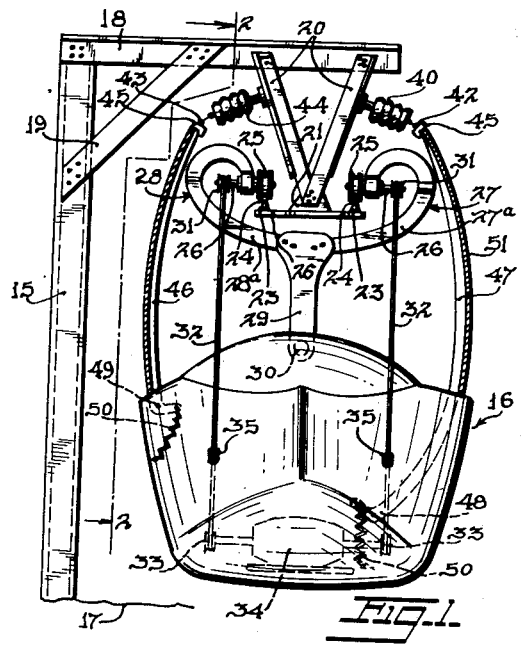
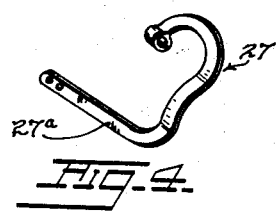
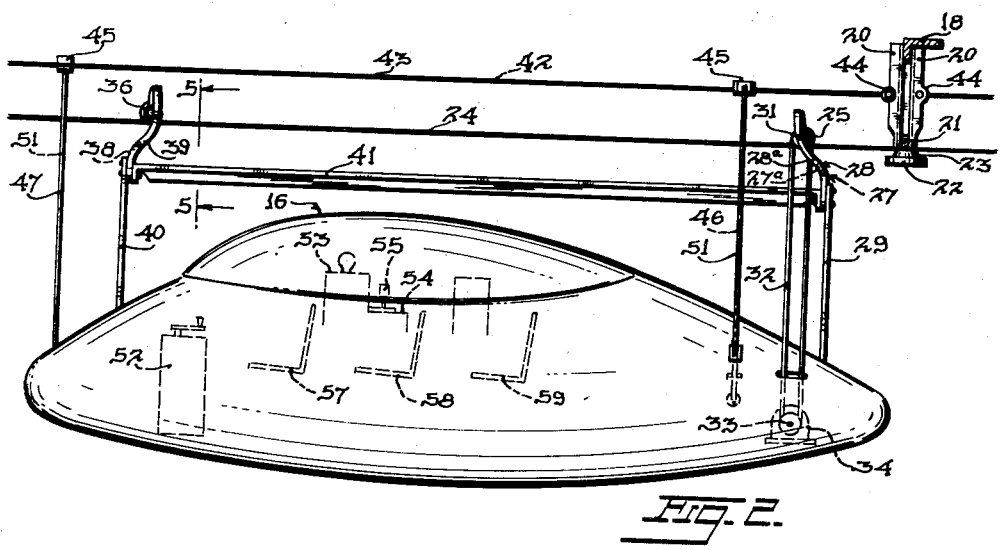
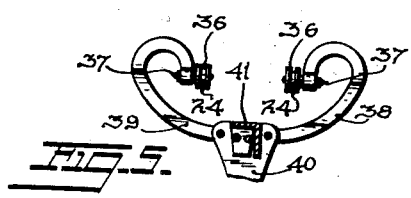
INVENTOR.
ROBERT A. MASSEY
BY
ATTORNEY Patented Apr. 3, 1951

2,547,715

UNITED STATES PATENT OFFICE 2,547,715

OVERHEAD-SUSPENDED CAR FOR RACE TRACKS

Robert A. Massey, New York, N. Y.

Application July 24, 1947, Serial No. 763,389

3 Claims. (Cl. 105—154)

This invention provides a new and useful electrically propelled overhead suspended, full sized, passenger vehicle or car, or midget self-propelled car without passengers, for travel around a race track or the like during progress of a race.

According to the invention, the car, provided with a number of comfortable seats and covered over its top with glass extended down to below the eye level of the seated passengers, is preferably shaped like an automobile body, but made much less expensively and of much less weight, so that for these reasons and in view of the manner of suspension of the car the latter may be made at trifling cost compared to that of an ordinary road vehicle of the same passenger capacity—say a passenger capacity of six persons. Thus, all the official judges could be passengers in the car, as comfortably seated therein as though on the grandstand, and yet able to observe closely every movement of the race fully as well as though somehow supported in space right over the horses or other contestants in the race at every moment of the contest.

The suspension of the full sized or midget car is from one or more overhead cables extended to encircle the race track, and current supply and return wires extend parallel with such cable or cables so that an electric motor in the car may be energized by way of connections to said wires; thereby permitting an ordinary stop, start and change-speed controller such as is handled by the motorman of a trolley car to be used in direct relation to the motor for employing the motor to propel the car. As a result, such complexities as clutch, change speed transmission, differential, and like complexities which add so much to the cost and weight of a road vehicle, are completely eliminated. The car, the load capacity of which need not exceed 1500 pounds, may be constructed, therefore, to have fairly light angle iron frame members, with simple interior flooring, and with an exterior below the glass top of thin sheet aluminum.

Also according to the invention, the car carries a television camera and transmitter, for operation by an occupant of the car for visual broadcasting of the race, a radio sound transmitting apparatus through the microphone of which an occupant of the car may verbally broadcast comments on the race, and, in the case of the midget passengerless car, an electrically operated motion picture camera for making on film a permanent record of the race. The television transmitter and the camera would be so installed in the car that their lenses would be above the bottom of the transparent upper portion of the car, and such portion would be provided with windshield wipers electrically operated, so that in rainy weather said lenses would function perfectly.

The passenger or midget car may be propelled by way of the motor in any suitable way, but the preferred arrangement is to employ a power transmission from the motor to one or more propelling wheels for the car riding on the cable suspension, characterized by the use of pulleys and a belt or belts, or gears of fibre or the like; as such a transmission makes the noise from travel of the car not any greater than that of a quiet running sewing machine. As here shown, but solely by way of example, two suspension cables are employed, each engaged by a pair of overlying groove wheels, one above a forward point of the car and one above a rear point of the car; pulleys are associated with said wheels for rotation therewith; and belts drive said pulleys. Only one suspending cable need be employed, however, if the car is of about the same or smaller size than that indicated in the accompanying drawings.

Provisions are made for ready disconnection of the car from its cable suspension, to permit transport of the car to other tracks for use there. For facilitating such transport, the car could be equipped with simple wheel including running gear to allow it to be towed to the new location. When not equipped with wheels, the car could have a flat smooth bottom for safe placement of the car on a trailer.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view, looking toward the rear end of a car pursuant to the invention and one suspended from two cables; this view also showing one of several posts for carrying the mounting means for said cables, for the current supply wire and for the current return wire.

Fig. 2 is a vertical section taken on the line 2—2 of Fig. 1, and so showing the car of Fig. 1 in side elevation.

Fig. 3 is a top plan view of a part shown elevationally in Fig. 1.

Fig. 4 is a view showing said part in perspective.

Fig. 5 is a fragmentary vertical section, taken on line 5—5 of Fig. 2.

Referring to the drawings in detail, there will first be described the post 15 of Fig. 1 and the parts carried thereby and by the plurality of like posts erected at suitable intervals around the race track or other arena the contest within which is to be observed and reported on by the present invention from what may be called the midget car of the invention, which car as a whole is marked 16.

The post 15 is shown as made of a length of channel steel suitably embedded in the ground 17; the height of the post above the ground being such that the bottom of the car will be somewhere between 1 foot and 15 feet above ground level. Said posts may be placed about 8 feet apart; each embedded, say in concrete, to a depth of about 4 feet.

Suitably riveted to and horizontally offset from the top of the post 15 is an angle iron beam 18, stayed by a metal strip 19. Near the outer end of said beam are secured a pair of angle irons 20 downwardly converged, these secured at their bottoms to opposite sides of an upstanding rib 21 integral with a metal plate 22.

Beyond the ends of said rib and perpendicular thereto the plate 22 carries a pair of upwardly projected elongate mounts 23, these laterally upwardly tapered, and along the crests of which are suitably secured under-portions of the two suspending cables 24, which latter may well be steel cables about ⅝ of an inch in diameter.

Riding on each cable 24 is a grooved wheel 25, these wheels being above a rear point of the car 16. The wheels 25 are held to rotation about axes which are aligned at right angles to the length of the car by being fixed on shafts 26 maintained in coaxial relation by being journalled one in a part 27 and the other in a part 28. The parts 27 and 28 are fixedly connected at their bottoms, as by the rivets indicated, to the upper end of a suspending bar 29 pivotally coupled at 30 (Fig. 1) near its lower end to, and at a suitable point within, the car 16 near the rear end thereof.

The parts 27 and 28, which conveniently are made as castings, are exactly alike, except that they are made, as the expression goes in foundry practice, one right-hand and the other left-hand, so that, with said parts symmetrically facing each other as in Fig. 1, the portion 28ª of the part 28 will line up with the portion 27ª of the part 27 when said parts are viewed as in Fig. 2.

Also fixed on each shaft 26 is a pulley 31. An endless belt 32 connects one pulley 31 with a pulley 33 on one end of the shaft of the electric motor 34, and another endless belt 32 connects the other pulley 31 with another pulley 3 on the other end of said motor shaft. These belts pass down into the body of the car through openings 35.

Above the front end of the car a grooved wheel 36 rides on each cable 24, like the grooved wheels 25. The wheels 36 are also held to rotation about axes which are aligned at right angles to the length of the car by being fixed on shafts 37 journalled coaxially transverse to the cables 24 on parts 38 and 39 connected at their bottoms, as by the rivets indicated, to the upper end of a suspending bar 40 pivotally coupled near its lower end to a point within the car 16, with each pivotal mounting of the bar 40 like, and in a fore and aft line with, the coupling 30 for the rear suspending bar 29.

It may be pointed out that the part 39 is actually a duplicate of the part 28, and that the part 38 is actually a duplicate of the part 27; which fact further makes for reduction in the cost of manufacture of the car. Thus, just as the rearwardly downwardly extending lower portions 28ª and 27ª of the parts 28 and 27 make room for the belts 32, the forwardly downwardly extended corresponding portions of the parts 38 and 39 would allow for the use also of forward belts (not shown), if it were desired to add the last-named belts for driving the forward grooved wheels 36 as tractive elements additional to the rear grooved wheels 25.

In the case last referred to, the pulleys to be mounted in the forward part of the car for driving the last-named belts could be connected by gears, belts, chains or otherwise to the motor 34 for drive therefrom.

However, said motor is illustrated as merely driving the wheels 25, and accordingly the shafts 37 for the wheels 36 are shown merely as stub shafts. For these there would be substituted, should the wheels 36 be desired also to be power driven, shafts like the shafts 26 and having fixed thereon pulleys like the pulleys 31.

In order to hold the car 16 to perfect suspension from the overhead wheels 25 and 36, that is, to prevent forward or backward sway of the suspending bars 29 and 40, these are joined by an angle iron connector beam 41 having downbent portions at opposite ends secured to said bars by rivets forming parts of the riveting which couples the lower ends of the parts 27 and 28 to the bar 29 and the lower ends of the parts 38 and 39 to the bar 40.

Two current conducting wires 42 and 43, of copper or the like, are strung along the various posts, said wires mounted on porcelain, glass or other suitable insulators 44; one such wire for current supply, and the other for current return. Against each of said wires lies a contact shoe 45, each shoe suitably rockably carried at the upper end of an upstanding arm, one such arm marked 46 and the other 47. These arms are at the opposite sides of the car 16, and they are substantially alike, except that the arm 47 is longer than the arm 46, as shown best in Fig. 1, and a pivotal mounting 48 is provided for the arm 47 at a lower point than a similar pivotal mounting 49 for the arm 46, and with the arms arranged, for example, as in Fig. 2, of said mountings 48 and 49 are within the body of the car 16. As has been brought out above, the car of the present invention is intended for use on race tracks. The latter are usually elliptical in shape. The posts 15 are intended to be positioned around the circumference of the infield of the race track whereby the car 16 may overhang the track itself. When the car is going around sharp curves, that is the ends of the ellipse, the car will swing outwardly due to centrifugal force. At no time, however, will there be any appreciable inward swing of the car. Therefore, in order to maintain the arms 46 and 47, particularly the arm 47, in contact with the trolley wires 42 at all times, the arm 47 will necessarily have to have a longer throw or arc of movement than the arm 46.

Each arm 46 and 47 has an offset bottom extension as shown in Fig. 1, and to each of said extensions is connected a spring 50 for yieldingly urging the associated arm to maintain the shoe 45 thereof always in contact with its wire 42 and 43. At the outer side of each arm 46 and 47 is an insulating BX cable 51, containing the lead (not shown) running down along the arm from the latter's shoe 45; said shoe being suitably insulated from the arm.

Delineation is omitted of the electrical connections from the two leads carried by the arms 46 and 47 whereby within the car 16 the motor may be started, stopped and run at various selected speeds, by manipulation in a familiar way of the controller 52, and the other electrical connections whereby there may be electrically operated the windshield wipers (not shown), and also the diagrammatically indicated television transmitting apparatus 53, the radio transmitter 54 having the microphone 55, and the motion picture camera 56; as said electrical connections are matters for the electrician.

Three seats, for the persons to be carried by the car, are indicated at 57, 58 and 59. The glass top of the car may be as shown at 60; and one side of the car may have one or more suitable doors (not shown) at one or both sides thereof.

It is to be clearly understood that the mechanism herein referred to and described can pertain to a regular passenger car or can be just as conveniently constructed along midget lines and carry no passengers but can be amply equipped to carry various items for relaying details of the races or events taking place. Television or movie camera for broadcasting or film recording or any popular method of relaying may be employed not only for the convenience of those present at the track but may be sent out by wire to the television machines of the public.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. In an aerial car for use over a racetrack and adapted to travel on parallel cables supported horizontally over the racetrack, a support pivoted on the longitudinal axis of said car to freely pivot relative to said car opposed outwardly extending members secured to said support, said outwardly extending members having inwardly extending upper ends, shafts mounted in said inwardly extending upper ends of said members, and grooved wheels mounted on said shafts and adapted to run on the supporting cables.

2. In an aerial car for use over a racetrack and adapted to travel on parallel cables supported horizontally over the racetrack, front and rear supports pivoted on the longitudinal axis of said car to freely pivot relative to said car, pairs of opposed outwardly extending members secured to said supports, said outwardly extending members having inwardly extending upper ends, shafts mounted in said inwardly extending upper ends of said members, and grooved wheels mounted on said shafts and adapted to run on the supporting cables.

3. In an aerial car for use over a racetrack and adapted to travel on parallel cables supported horizontally over the racetrack, front and rear supports pivoted on the longitudinal axis of said car, to freely pivot relative to said car, a longitudinal brace connecting said front and rear supports, pairs of opposed outwardly extending members secured to said supports, said outwardly extending members having inwardly extending upper ends carrying rotative shafts, and grooved wheels mounted on said shafts and adapted to run on the supporting cables.

ROBERT A. MASSEY.

REFERENCES CITED

The following references are of record in the file of this patent:

UNITED STATES PATENTS

| Number | Name | Date |
| --- | --- | --- |
| 331,387 | Enos | Dec. 1, 1885 |
| 342,757 | Morrison | May 25, 1886 |
| 456,867 | Valley | July 28, 1891 |
| 495,246 | Gaguier | Apr. 11, 1893 |
| 506,570 | Valley | Oct. 10, 1893 |
| 911,332 | Rosenthal | Feb. 2, 1909 |
| 973,633 | Davis | Oct. 25, 1910 |
| 1,200,393 | Neller | Oct. 3, 1916 |
| 1,455,390 | Davino et al. | May 15, 1923 |
| 1,703,496 | Naud et al. | Feb. 26, 1929 |
| 1,801,001 | Henderson | Apr. 14, 1931 |
| 1,802,550 | Bennington | Apr. 28, 1931 |
| 2,242,065 | Gabonry | May 13, 1941 |
| 2,281,794 | Peebles | May 5, 1942 |